United States Patent
Hong (10) Patent No.: US 11,418,982 B2
(45) Date of Patent: Aug. 16, 2022

(54) METHODS AND APPARATUSES FOR MDT MEASUREMENT

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 136 days.

(21) Appl. No.: 17/042,890

(22) PCT Filed: Apr. 3, 2018

(86) PCT No.: PCT/CN2018/081721
§ 371 (c)(1),
(2) Date: Sep. 28, 2020

(87) PCT Pub. No.: WO2019/191894
PCT Pub. Date: Oct. 10, 2019

(65) Prior Publication Data
US 2021/0029563 A1    Jan. 28, 2021

(51) Int. Cl.
*H04W 24/08* (2009.01)
*H04L 43/16* (2022.01)
(Continued)

(52) U.S. Cl.
CPC ............ *H04W 24/08* (2013.01); *H04L 43/16* (2013.01); *H04W 4/33* (2018.02); *H04W 24/10* (2013.01); *H04W 4/80* (2018.02); *H04W 84/12* (2013.01)

(58) Field of Classification Search
CPC ....... H04W 24/08; H04W 24/10; H04W 4/33; H04W 4/80; H04W 43/16; H04W 84/12; H04L 43/16
See application file for complete search history.

(56) References Cited

U.S. PATENT DOCUMENTS

2014/0194109 A1*  7/2014  Nunzi ................... H04W 24/08
                                                          455/418
2017/0374588 A1   12/2017  Guo et al.

FOREIGN PATENT DOCUMENTS

CN    103813370 A    5/2014
CN    104853432 A    8/2015
(Continued)

OTHER PUBLICATIONS

CMCC, "Introduction of new measurement collection in MDT," 3GPP TSG-RAN WG2 Meeting #101, R2-1803238, Athens, Greece, Feb. 26-Mar. 2, 2018 (Year: 2018).*
(Continued)

*Primary Examiner* — Brian P Cox
(74) *Attorney, Agent, or Firm* — Arch & Lake LLP (57) ABSTRACT

Methods and apparatuses for MDT measurement are provided. In one aspect, a method for MDT measurement includes: obtaining MDT measurement configuration information for one or more preset types of network devices, the MDT measurement configuration information including at least a signal strength threshold for the preset type of network device; sending the MDT measurement configuration information to user equipment (UE), such that the UE performs MDT measurement upon detecting that signal strength of the preset type of network device exceeds the signal strength threshold; receiving information on the MDT measurement of the preset type of network device from the UE.

17 Claims, 7 Drawing Sheets

(51) Int. Cl.
  *H04W 4/33* (2018.01)
  *H04W 24/10* (2009.01)
  *H04W 4/80* (2018.01)
  *H04W 84/12* (2009.01)

(56) References Cited

FOREIGN PATENT DOCUMENTS

| CN | 104904286 A | 9/2015 |
|---|---|---|
| CN | 108521874 A | 9/2018 |
| EP | 2860883 A1 | 4/2015 |
| EP | 3749007 A1 | 12/2020 |
| WO | 2017023229 A1 | 2/2017 |
| WO | 2013166709 A1 | 12/2017 |

OTHER PUBLICATIONS

Extended European Search Report issued in European Application No. 18913844.9 dated Mar. 10, 2021, (11p).

Written Opinion of the International Searching Authority issued in Application No. PCT/CN2018/081721 dated Jan. 3, 2019, (8p).

Second Office Action and Search Report issued in Chinese Application No. 201880000381.X, dated Sep. 14, 2020 with English translation (10p).

International Search Report to PCT Application No. PCT/CN2018/081721 dated Jan. 3, 2019 with English translation (4p).

First Office Action issued in Chinese Application No. 201880000381.X dated Jan. 6, 2020 with English translation, (12p).

Huawei, HiSilicon, "Overview of WLAN and Bluetooth measurement collection in MDT", 3GPP TSG-RAN WG2 Meeting #101, Athens, Greece, R2-1802878, Feb. 26-Mar. 2, 2018, (5p).

Kyocera, "Considerations for MDT with WLAN/BT measurements", 3GPP TSG-RAN WG2 #101, Athens, Greece, R2-1803426, Feb. 26-Mar. 2, 2018, (5p).

CMCC, "Consideration on Bluetooth/WLAN measurement collection in MDT", 3GPP TSG-RAN WG2 meeting #101, Athens, Greece, R2-1803770(revision of R2-1803224), Feb. 26-Mar. 2, 2018, (6p).

* cited by examiner

METHODS AND APPARATUSES FOR MDT MEASUREMENT

CROSS REFERENCE TO RELATED APPLICATIONS

This application is the national phase application of International Application No. PCT/CN2018/081721 entitled "METHODS AND APPARATUSES FOR MDT MEASUREMENT" and filed on Apr. 3, 2018, the disclosure of which is incorporated herein by reference in its entirety for all purposes.

TECHNICAL FIELD

The present disclosure relates to communication technologies and particularly to methods and apparatuses for MDT measurement.

BACKGROUND

Drive Tests (DT) can reflect status of a network, play a role in directly measuring and evaluating network performance, and indicate problems of the network. For example, minimization of drive tests (MDT) technology defined in 3rd Generation Partnership Project (3GPP) may be adopted to improve the network based on a measurement report provided by user equipment (UE), which is applicable in scenarios such as improvement of a coverage of the network, improvement of a capacity of the network, improvement of mobility management of the network, assurance of Quality of Service (QoS) of the network, and the like.

Traditional MDT technology is mainly applicable to outdoor scenarios where UE can carry out accurate positioning based on Global Positioning System (GPS) and report MDT measurement information. With the development of mobile communication technology, more and more mobile communications and traffic are generated indoors, and more and more Bluetooth devices and Wireless Local Area Network (WLAN) devices are deployed indoors. Thus, the traditional MDT technology faces some challenges. For example, the GPS positioning, which the traditional MDT technology relies on, cannot work properly indoors, resulting in inaccurate positioning information.

For indoor scenarios, UE may measure its surrounding Bluetooth devices and/or Wi-Fi devices and report the measurement information to solve the problem. However, with the MDT technology in indoor scenarios, the UE may frequently perform MDT measurement and report MDT measurement information, which may increase UE power consumption and signaling overhead.

SUMMARY

Examples of the present disclosure may provide methods and apparatuses for MDT measurement to reduce power consumption and signaling overhead for UE reporting MDT measurement information.

According to a first aspect of examples of the present disclosure, a method of MDT measurement is provided, which is applicable to a base station. The method includes:

obtaining minimization of drive tests (MDT) measurement configuration information for one or more preset types of network devices, the MDT measurement configuration information for each of the one or more preset types of network devices including at least: a signal strength threshold for the preset type of network device;

sending the MDT measurement configuration information to UE, such that the UE performs MDT measurement upon detecting that the signal strength of the preset type of network device exceeds the signal strength threshold;

receiving information on the MDT measurement of the preset type of network device from the UE.

In an example, obtaining MDT measurement configuration information for the one or more preset types of network devices includes:

receiving initial MDT measurement configuration information from a core network or a source base station, the initial MDT measurement configuration information for each of the one or more preset types of network devices includes: the signal strength threshold for the preset type of network device;

generating the MDT measurement configuration information based on the initial MDT measurement configuration information for the one or more preset types of network device and one or more preset MDT measurement parameters.

In an example, sending the MDT measurement configuration information to the UE includes:

determining a type of a target network device detected by the UE;

determining target MDT measurement configuration information according to the type of the target network device and the MDT measurement configuration information;

sending the target MDT measurement configuration information to the UE.

In an example, the one or more preset types of network devices comprise at least one of a Bluetooth device or a wireless local area network (WLAN) device.

According to a second aspect of examples of the present disclosure, a method of MDT measurement is provided, which is applicable to a user equipment (UE). The method includes:

receiving, from a base station, MDT measurement configuration information, and performing an MDT measurement configuration based on the received MDT measurement configuration information, the MDT measurement configuration information including at least one signal strength thresholds for one or more preset types of network device;

detecting a signal strength of a target network device;

performing MDT measurement on of the target network device when the signal strength exceeding the signal strength threshold for the target network device;

sending the information on the MDT measurement of the target network device to the base station.

In an example, the method further includes: prior to receiving, from the base station, the MDT measurement configuration information, Reporting a type of the target network device currently detected to the base station.

In an example, sending the information on the MDT measurement of the target network device to the base station includes:

storing the information on the MDT measurement of the target network device;

sending the stored information on the MDT measurement of the target network device to the base station in response to the UE switching to a connection state.

In an example, the method further includes: after sending the information on the MDT measurement of the target network device to the base station, deleting the stored information on the MDT measurement of the target network device.

In an example, the one or more preset types of network devices comprise at least one of a Bluetooth device or a WLAN device.

According to a third aspect of examples of the present disclosure, an apparatus for MDT measurement is provided, which is set in a base station. The apparatus includes:

a configuration information obtaining module, configured to obtain minimization of drive tests (MDT) measurement configuration information for one or more preset types of network devices, the MDT measurement configuration information for each of the one or more preset types of network devices includes at least: a signal strength threshold for the preset type of network device;

a sending module, configured to send the MDT measurement configuration information to UE, such that the UE performs MDT measurement upon detecting that the signal strength of the preset type of network device exceeds the signal strength threshold; and a receiving module, configured to receive information on the MDT measurement of the preset type of network device from the UE.

In an example, the configuration information obtaining module includes:

an information receiving sub-module, configured to receive initial MDT measurement configuration information from a core network or a source base station, the initial MDT measurement configuration information for each of the one or more preset types of network devices includes: the signal strength threshold for the preset type of network device;

a configuration information generating sub-module, configured to generate the MDT measurement configuration information based on the initial MDT measurement configuration information for the one or more preset types of network device and one or more preset MDT measurement parameters.

In an example, the sending module includes:

a device type determining sub-module, configured to determine a type of a target network device detected by the UE;

a target configuration determining sub-module, configured to determine target MDT measurement configuration information according to the type of the target network device and the MDT measurement configuration information.

a sending sub-module, configured to send the target MDT measurement configuration information to the UE.

In an example, the one or more preset types of network devices include at least one of a Bluetooth device or a wireless local area network (WLAN) device.

According to a fourth aspect of examples of the present disclosure, an apparatus for MDT measurement is provided, which is set in a user equipment (UE). The apparatus includes:

an information configuring module, configured to receive from a base station, MDT measurement configuration information, and performing an MDT measurement configuration based on the received MDT measurement configuration information, the MDT measurement configuration information including at least one signal strength thresholds for one or more preset types of network device;

a detecting module, configured to detect a signal strength of a target network device;

an MDT measuring module, configured to perform MDT measurement on of the target network device when the signal strength exceeding the signal strength threshold for the target network device;

a reporting module, configured to send the information on the MDT measurement of the target network device to the base station.

In an example, the apparatus further includes:

a device type reporting module, configured to report a type of the target network device currently detected to the base station.

In an example, the reporting module further includes:

a storing sub-module, configured to store the information on the MDT measurement of the target network device;

a sending sub-module, configured to send the stored information on the MDT measurement of the target network device to the base station when the UE switches to a connection state.

In an example, the apparatus further includes:

a deleting module, configured to delete the stored information on the MDT measurement of the target network device.

In an example, the one or more preset types of network devices include at least one of a Bluetooth device, or a wireless local area network WLAN device.

According to a fifth aspect of the examples of the present disclosure, a computer-readable storage medium is provided, the storage medium storing a computer program that, when executed by a processor, cause the processor to implement the steps of any above-described method in the first aspect.

According to a sixth aspect of the examples of the present disclosure, a computer-readable storage medium is provided, the storage medium storing a computer program that, when executed by a processor, cause the processor to implement the steps of any above-described method in the second aspect.

According to a seventh aspect of the examples of the present disclosure, an apparatus for MDT measurement is provided, including: a processor; a memory for storing executable instructions by the processor; wherein, the processor is configured to:

obtain minimization of drive tests (MDT) measurement configuration information for one or more preset types of network devices, the MDT measurement configuration information at least includes: a signal strength threshold for the preset type of network device;

send the MDT measurement configuration information to UE, so that the UE performs MDT measurement upon detecting that the signal strength of the preset type of network device exceeds the signal strength threshold;

receive information on the MDT measurement of the preset type of network device from the UE.

According to an eighth aspect of the examples of the present disclosure, an apparatus for MDT measurement is provided, including: a processor; a memory for storing executable instructions by the processor; wherein, the processor is configured to:

receive from a base station, MDT measurement configuration information, and performing an MDT measurement configuration based on the received MDT measurement configuration information, the MDT measurement configuration information including at least one signal strength thresholds for one or more preset types of network device;

detect a signal strength of a target network device perform MDT measurement on of the target network device when the signal strength exceeding the at least one signal strength thresholds for the one or more preset types of network device;

send the information on the MDT measurement of the target network device to the base station.

It should be understood that the above general description and the following detailed description are only exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Examples will be described in detail here with the examples thereof expressed in the drawings. Where the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The term used in the present disclosure is for the purpose of describing particular examples only and is not intended to limit the present disclosure. As used in this disclosure and the appended claims, the singular forms "a", "an" and "the" are intended to include the plural forms as well, unless the context clearly indicates otherwise. It should also be understood that the term "and/or" as used herein refers to and includes any and all possible combinations of one or more of the associated listed items.

It shall be understood that, although the terms "first," "second," "third," and the like may be used herein to describe various information, the information should not be limited by these terms. These terms are only used to distinguish one category of information from another. For example, without departing from the scope of the present disclosure, first information may be referred as second information; and similarly, second information may also be referred as first information. As used herein, the term "if" may be interpreted as "when" or "upon" or "in response to determining" depending on the context.

The terms "network" and "system" appearing in this disclosure express a same concept, and the communication system is the communication network.

An application scenario of the method of MDT measurement provided in the present disclosure is: UE performing MDT measurement on preset type of network devices distributed indoors such as Bluetooth devices and WLAN devices, and reporting the MDT measurement information of the preset type of network devices such as position information, signal strength, measurement time, and the like to a base station, so that the base station can accurately analyze the network conditions in a current area and improve the network based on MDT measurement information of each of the preset type of network devices within the coverage area of the base station.

Figure 1:
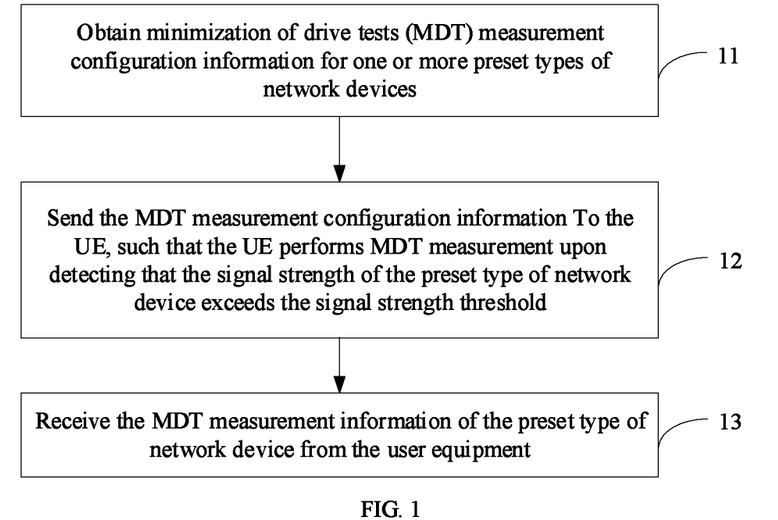
FIG. 1 is a flowchart of a method of MDT measurement according to an example of the A present disclosure.

Based on the above application scenario, the present disclosure provides a method of minimization of drive tests (MDT) measurement, which is applicable to a base station. FIG. 1 is a flowchart of a method of MDT measurement according to an example of the present disclosure. The method may include the following steps.

At step 11, MDT measurement configuration information for one or more preset types of network devices is obtained, where the MDT measurement configuration information for each of the one or more preset types of network devices includes at least: a signal strength threshold for the preset type of network device.

In the present disclosure, the MDT measurement configuration information for the one or more preset types of network devices determined by the base station may be used to indicate conditions under which the UE in its coverage area performs the MDT measurement on the one or more preset types of network devices and reports measurement information, and may also be used to indicate what parameters may be measured by the UE during the MDT measurement.

In the examples of the present disclosure, the preset type of network devices may include: Bluetooth devices and/or WLAN devices.

In an example of the present disclosure, the MDT measurement configuration information for a preset network device may include: a correspondence between a device type of a preset network device and a signal strength threshold. For example, as shown in Table 1:

TABLE 1

| Device type | Signal strength threshold |
|---|---|
| Bluetooth device | First RSSI threshold |
| WLAN device | Second RSSI threshold |

In Table 1, the RSSI (Received Signal Strength Indication) threshold may be used to represent a measurement strength threshold for a preset type of network device. For example, the first RSSI threshold corresponding to the Bluetooth device may be set to: −90 dbm.

In the present disclosure, the base station may obtain the MDT measurement configuration information for the one or more preset types of network devices in at least two ways as follows.

In the first way, the base station may determine the MDT measurement configuration information for the one or more preset types of network devices by itself. For example, the base station may determine the MDT measurement configuration information for the one or more preset types of network devices according to parameter values manually set by relevant technical personnel based on their experience; the base station may also utilize artificial intelligence based on historical data to intelligently analyze the above MDT measurement configuration information for the one or more preset types of network devices.

In the second way, the base station may determine the MDT measurement configuration information for the one or more preset types of network devices according to initial MDT measurement configuration information for the one or more preset types of network devices received from a core network or a source base station.

The initial MDT measurement configuration information is determined by the core network or the source base station, and then sent to the base station. The initial MDT measurement configuration information at least includes: a signal strength threshold for a preset type of network device.

In an example of the present disclosure, the base station may directly determine the received initial MDT measurement configuration information as the MDT measurement configuration information for the one or more preset types of network devices.

In another example of the present disclosure, the base station may also make adjustments based on the initial MDT measurement configuration information in combination with demands of the base station to determine the MDT measurement configuration information for the one or more preset types of network devices.

Figure 2:
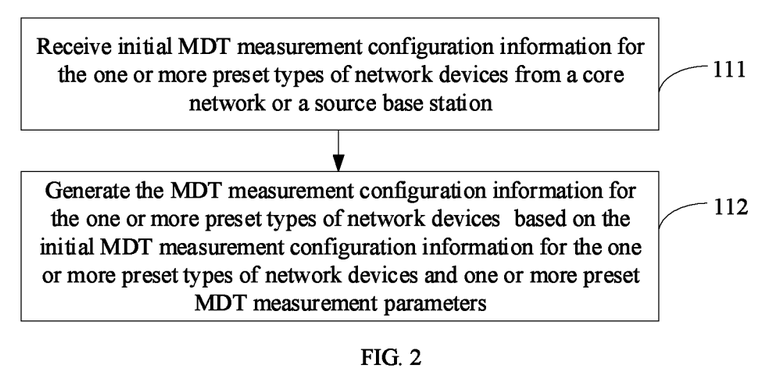
FIG. 2 is a flowchart of another method of MDT measurement according to an example of the present disclosure.

FIG. 2 is a flowchart of another method of MDT measurement according to an example of the present disclosure. The above step 11 may include the following steps.

At step 111, initial MDT measurement configuration information for the one or more preset types of network devices is received from a core network or a source base station, where the initial MDT measurement configuration information for each of the one or more preset types of network devices includes: a signal strength threshold for the preset type of network device.

The initial MDT measurement configuration information may be applicable to base stations in the entire network.

At step 112, the MDT measurement configuration information for the one or more preset types of network devices is generated based on the initial MDT measurement configuration information for the one or more preset types of network devices and one or more preset MDT measurement parameters.

The preset MDT measurement parameters may be determined according to different network measurement requirements. For example, if the base station wants to know a distribution of preset type of network devices in the coverage area, the preset MDT measurement parameters may be positions.

In another example, the base station may also determine the one or more preset MDT measurement parameters according to known information of the one or more preset types of network devices in the coverage area, and further determine the MDT measurement configuration information for its coverage area on a basis of the initial MDT measurement configuration information.

For example, taking the one of the preset types of network devices as a WLAN AP, assuming that base station A wants to know network performance of one or more designated WLAN APs in the coverage area, base station A may identify the identification, for example SSIDs (Service Set Identifier), of the designated WLAN APs as the measurement parameters, which is set in the MDT measurement configuration information and sent to the UE.

Correspondingly, when the UE performs MDT measurement on the WLAN AP, it first determines to perform the measurement when the received signal strength of the preset type of network device exceeds the measurement strength threshold to obtain initial measurement information. The initial measurement information includes correspondence between the SSID of each network device and the MDT measurement information. After that, the UE may only send the MDT measurement information of the WLAN AP that meets the above SSID-related condition to the base station, thereby reducing the MDT measurement and reporting for the UE, reducing UE power consumption, and saving the signaling overhead of the UE for reporting MDT measurement information.

At step 12, the MDT measurement configuration information is sent to the UE, such that the UE performs MDT measurement upon detecting that the signal strength of the preset type of network device exceeds the signal strength threshold.

In an example of the present disclosure, the base station may send the MDT measurement configuration information for the preset type of network device to the UE through upper-layer RRC (Radio Resource Control) signaling, such as MeasConfig RRC signaling.

In another example of the present disclosure, the base station may also load the MDT measurement configuration information into broadcast signaling or PDCCH (Physical Downlink Control Channel) signaling in a physical layer, and send it to the UE.

In the present disclosure, step 12 may be implemented in at least two ways.

In a first way: after the measurement configuration information is determined by the UE, the base station may directly send the measurement configuration information to the UE.

In a second way, before the measurement configuration information is sent to the UE, the base station may first obtain a device type of the preset network device currently detected by the UE.

Figure 3:
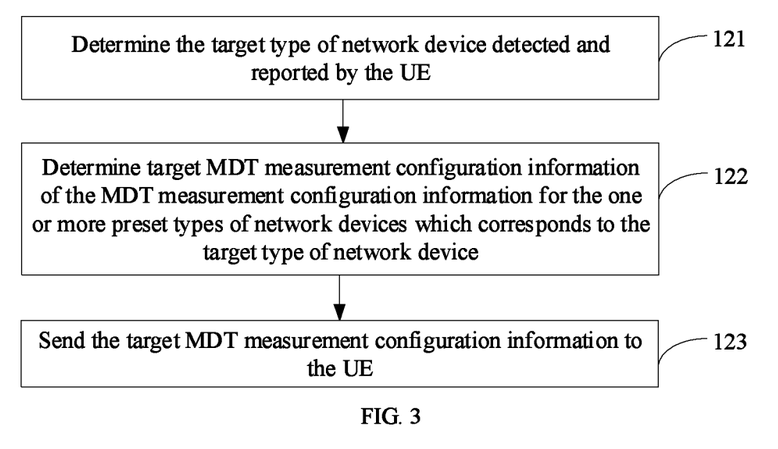
FIG. 3 is a flowchart of another method of MDT measurement according to an example of the present disclosure.

FIG. 3 is a flowchart of another method of MDT measurement according to an example of the present disclosure. The above step 12 may include the following steps.

At step 121, a type of a target network device detected by the UE is determined.

The type of the target network device belongs to one or more device types of the preset network devices.

At step 122, target MDT measurement configuration information is determined according to the type of the target network device and the MDT measurement configuration information.

In an example of the present disclosure, if the one or more types of preset network devices include two or more types of network devices, for example, a Bluetooth device and a WLAN device, the MDT measurement configuration information for the one or more preset types of network devices determined at step 11 includes: MDT measurement configuration information for a Bluetooth device, which may be referred to as first configuration information; and MDT measurement configuration information for a WLAN device, which may be referred to as second configuration information.

For example, taking the UE as a mobile phone M, if the target network devices currently detected by the mobile phone M are all Bluetooth devices, the base station may determine the first configuration information as the target MDT measurement configuration information, and send it to the mobile phone M for configuring the MDT measurement.

At step 123, the target MDT measurement configuration information is sent to the UE.

As in the above example, the base station may only load the first configuration information into preset signaling and send it to the mobile phone M, instead of sending both the first configuration information and the second configuration information to the mobile phone M through the preset signaling, which can avoid a waste of system resources and save signaling overhead.

It can be seen that in the present disclosure, if the base station sends the MDT measurement configuration information to each UE in a unicast manner, before sending the MDT measurement configuration information, the base station can first obtain the type of a target network device detected by a current UE, so that the base station can remove configuration information that is invalid for the current UE, reduce data volume of the MDT measurement configuration information, avoid waste of system resources due to sending redundant information, and save signaling overhead.

At step 13, the information on the MDT measurement of the preset type of network device is received from the user equipment is received.

After the base station sends the MDT measurement configuration information for the preset type of network device to the UE, the UE performs related configuration and performs MDT measurement on the preset type of network device based on the MDT measurement configuration information when an MDT measurement condition is met, and then reports the obtained MDT measurement information to the base station. The MDT measurement condition includes: the detected signal strength of the preset type of network device exceeds the signal strength threshold for the preset type of network device.

In an example of the present disclosure, the MDT measurement information of the preset type of network device may include at least one of the following: position information, RSSI signal strength, measurement time, and device identification (ID).

In an example, if the correspondence between the position information of each preset type of network device and the device ID is preset in the base station, the MDT measurement information reported by the UE to the base station may only include the device ID of the target network device, and not include detailed position information of the target network device. After the base station obtains the device ID of the target network device, the base station can determine the position information of the target network device according to the preset information, so that signaling overhead can be further saved.

Correspondingly, the present disclosure also provides a method of MDT measurement, which is applicable to UE. Referring to the flowchart of a method of MDT measurement shown in FIG. 4 according to an example of the present disclosure, the method may include the following steps.

Figure 4:
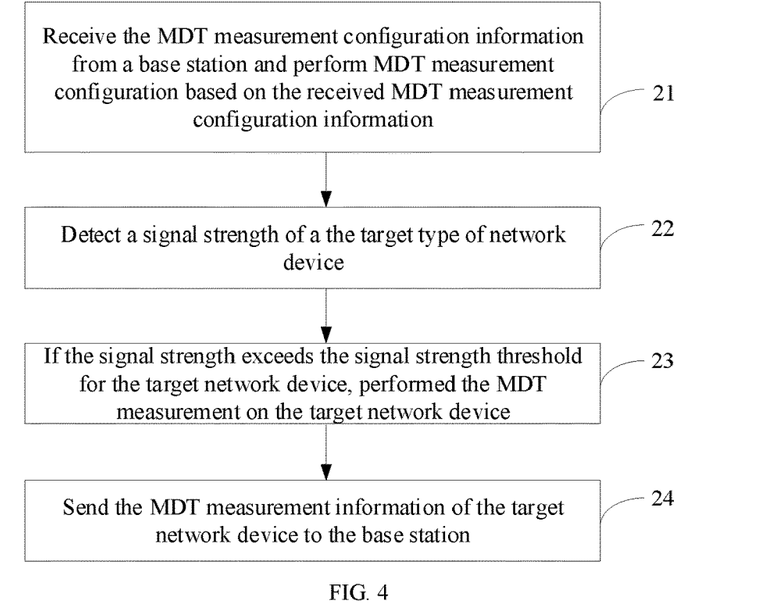
FIG. 4 is a flowchart of a method of MDT measurement according to an example of the present disclosure.

At step 21, the MDT measurement configuration information is received from a base station and MDT measurement configuration is performed by the UE based on the received MDT measurement configuration information, where the MDT measurement configuration information at least includes: at least one signal strength thresholds for one or more preset types of network device.

Corresponding to step 12, when the UE is in a connection state, the UE may receive the MDT measurement configuration information from the base station. The MDT measurement configuration information indicates the condition under which the UE obtains and reports the MDT measurement information of the one or more preset types of network devices.

In the present disclosure, the MDT measurement configuration information for each of the one or more preset types of network devices at least includes: a signal strength threshold for the preset type of network device. The one or more preset types of network devices include at least one of a Bluetooth device or a WLAN device.

At step 22, a signal strength of a target network device is detected by the UE.

After the UE completes the MDT measurement configuration for the preset type of network device, the UE may perform signal strength measurement on the detected target network device based on the MDT measurement configuration information, such as obtaining RSSI information of the target network device in real time. The target network device is a device of the same type as the preset type of network device detected by the UE.

At step 23, if the signal strength exceeds the signal strength threshold for the target network device, the MDT measurement on the target network device is performed by the UE.

In the present disclosure, the UE compares the detected signal strength of the target network device with the signal strength threshold for the preset type of network device. If the signal strength of the target network device exceeds the signal strength threshold for the preset type of network device, the UE performs MDT measurement on the target network device, obtains the MDT measurement information of the target network device, and performs the following step 24.

Conversely, if the signal strength of the target network device is less than or equal to the signal strength threshold for the target network device, MDT measurement is not performed so as to prevent the UE from performing MDT measurements on the target network device too frequently and wasting power, and also prevent the UE from reporting the MDT measurement information to the base station too frequently and thus causing a waste of resources.

The MDT measurement information may include information such as position information, signal strength, measurement time, and device identification (ID).

At step 24, the information on MDT measurement of the target network device is sent to the base station by the UE.

In the present disclosure, the implementation of step 24 may include the following two conditions.

Under a first condition, when the UE is in a connection state, the UE may perform MDT measurement on the target network device, and report the obtained MDT measurement information to the base station after the measurement is completed, so as to improve the time-efficiency of the MDT measurement.

Under a second condition, when the UE is in an idle state, the UE may perform the MDT measurement on the target network device, and store the obtained MDT measurement information locally. When the UE and the base station are connected, the locally stored MDT measurement information is sent to the base station. In this case, interferences of the MDT measurement and reporting on other normal communication services can be reduced.

Figure 5:
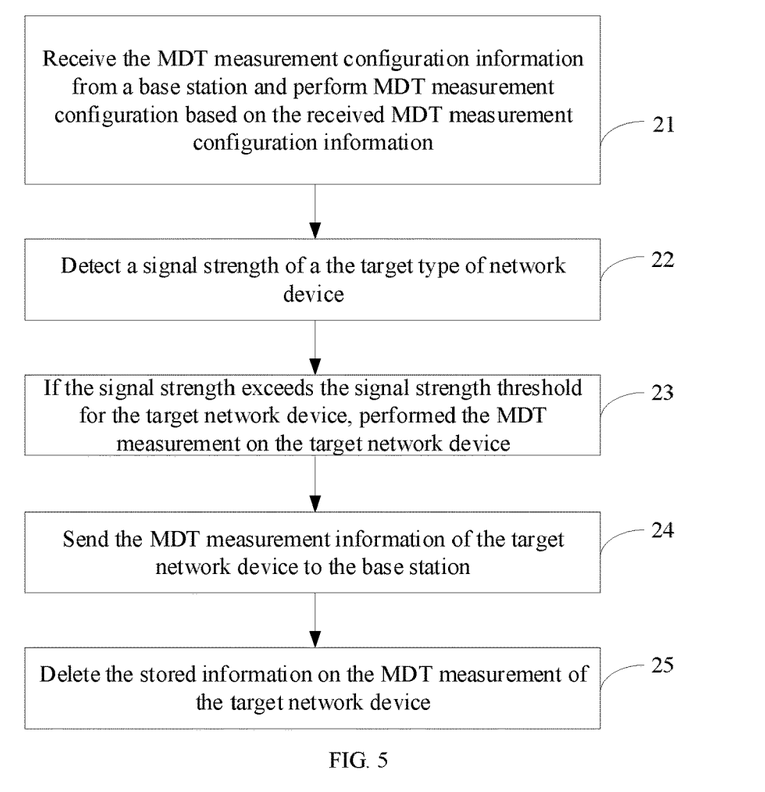
FIG. 5 is a flowchart of another method of MDT measurement according to an example of the present disclosure.

Corresponding to the second condition, FIG. 5 is a flowchart of another method of MDT measurement according to an example of the present disclosure. After step 24, the method may further include the following steps.

At step 25, the stored information on the MDT measurement of the target network device is deleted by the UE.

In an example of the present disclosure, after the UE sends the MDT measurement information for the target network device to the base station, the UE can automatically delete the stored information on MDT measurement, so as to release the occupied storage resources and prevent the large amount of MDT measurement information accumulating over time causing the MDT measurement information occupies too many storage resources of the UE and insufficient storage resources available for the UE, thereby improving the user experience of the UE.

Figure 6:
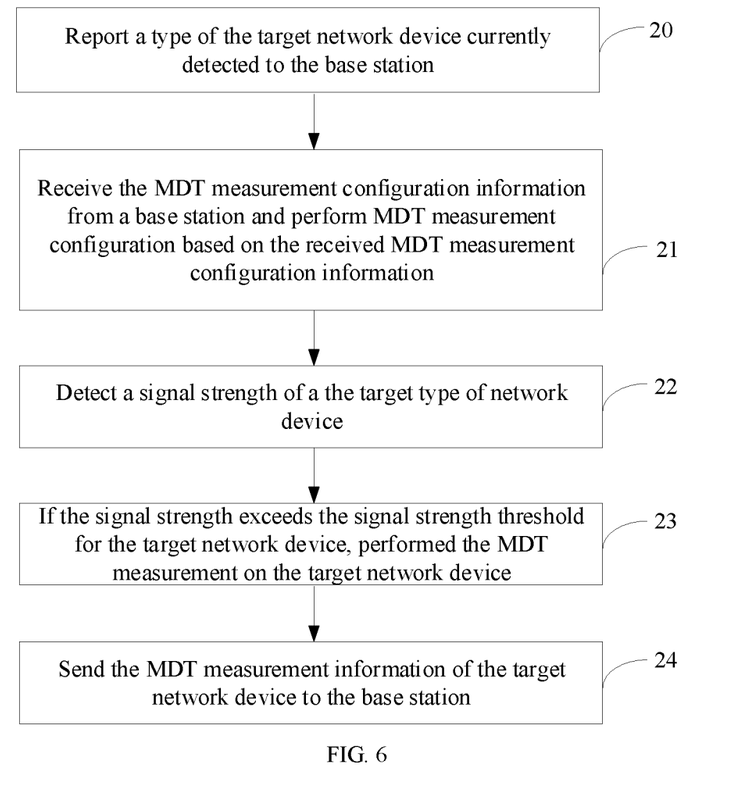
FIG. 6 is a flowchart of another method of MDT measurement according to an example of the present disclosure.

FIG. 6 is a flowchart of another method of MDT measurement according to an example of the present disclosure. Before step 21, the method may further include the following steps.

At step 20, the type of the target network device currently detected is reported to the base station by the UE.

Corresponding to step 121, in an example of the present disclosure, before the UE receives the MDT measurement configuration information sent by the base station, the UE may, according to the requirements of the base station or actively, report the type of the target network device currently detected so that the base station can selectively send the MDT measurement configuration information according to the type of the target network device. Therefore, the signaling overhead may be reduced. The type of the target network device belongs to one or more types of the preset network devices.

From the above, using the method of MDT measurement provided by the present disclosure, an UE can perform MDT measurement configuration information for one or more preset types of network devices sent by a base station; when the UE detects that a signal strength of a target network device exceeds a preset signal strength threshold, perform MDT measurement on the target network device and report the measurement information to the base station, which effectively avoids a waste of power consumption and system resources caused by frequent MDT measurement and reporting by the UE, realizes effective measurement for the one or more preset types of network devices while reducing power consumption and signaling overhead, and improves the user experience of UE for indoor application scenarios of MDT.

The following describes the method of MDT measurement provided by the present disclosure in combination with specific scenarios. The entities involved in the method include: a base station, a user equipment (UE), and one or more preset types of network devices for short-range communication with the UE, and may also include: a core network or a source base station. The execution subjects are independent to each other and cooperate with each other to realize the present disclosure. The specific process is as follows.

The core network or the source base station sends initial MDT measurement configuration information to the base station. The initial MDT measurement configuration information indicates conditions under which the UE performs MDT measurement on the detected and specific type of network device, where the initial MDT measurement configuration information at least includes: a signal strength threshold for a preset type of network device, for example, a signal strength threshold for a Bluetooth device and a signal strength threshold for a WLAN device.

After the base station receives the initial MDT measurement configuration information, the base station may directly send the initial MDT measurement configuration information to the UE in a coverage area through preset signaling. In another example of the present disclosure, the base station may also adjust the MDT measurement configuration information based on the initial MDT measurement configuration information in combination with its own network measurement requirements, and send the adjusted MDT measurement configuration information to the UE.

In another example of the present disclosure, before the base station sends the MDT measurement configuration information to a current UE, the base station may also receive a type of a target network device reported by the current UE, that is, a type of the target network device currently detected by the UE. If the target network device belongs to any of the preset types of network device, the base station may selectively send target MDT measurement configuration information suitable for the target network device to the current UE, so as to avoid sending redundant configuration information to the current UE and save signaling overhead.

The UE performs MDT configuration and measurement after receiving the MDT measurement configuration information sent by the base station. The specific measurement process is as follows: detecting a signal strength of the target network device in real time, and comparing the detected signal strength of the target network device with a preset signal strength threshold based on the MDT measurement configuration information; if the signal strength of the target network device exceeds the signal strength threshold for the preset type of network device, performing the MDT measurement on the target network device. That is, performing measurement according to preset measurement parameters in the MDT measurement configuration information, obtaining the MDT measurement information of the target network device, such as position information, signal strength, measurement time, etc., and reporting the MDT measurement information to the base station so that the base station can determine the distribution of one or more preset types of network devices in an area or improve network performance according to the MDT measurement information reported by the UE. Conversely, if the signal strength of the target network device is less than or equal to the signal strength threshold for the preset type of network device, the UE does not perform the MDT measurement on the target network device so as to avoid wastes of power consumption and signaling overhead, For brevity, the above method examples are all described as a series of combinations of actions, but those skilled in the art should understand that the present disclosure is not limited by the order of each of the described actions, because according to the present disclosure, some steps may be performed in other orders or at the same time.

In addition, those skilled in the art should also understand that examples described in the specification are merely illustrative, and the actions and modules involved are not necessarily required by the disclosure.

Corresponding to above examples of the application function implementation method, the present disclosure further provides examples of application function implementation apparatuses and corresponding terminals.

Figure 7:
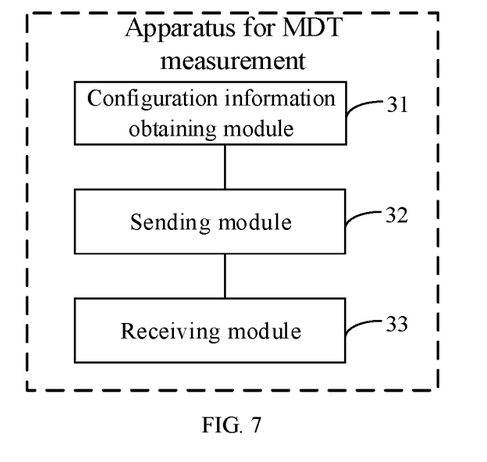
FIG. 7 is a block diagram of an apparatus for MDT measurement according to an example of the present disclosure.

FIG. 7 is a block diagram of an apparatus for MDT measurement according to an example of the present disclosure, which may be set in a base station. The apparatus may include the following modules.

A configuration information obtaining module 31, configured to obtain minimization of drive tests (MDT) measurement configuration information for one or more preset types of network devices, the MDT measurement configuration information for each of the one or more preset types of network devices at least includes: a signal strength threshold for the preset type of network device.

In an example of the present disclosure, the one or more preset types of network devices include at least one of a Bluetooth device or a wireless local area network (WLAN) device.

A sending module 32, configured to send the MDT measurement configuration information to UE, such that the UE performs MDT measurement upon detecting that the signal strength of the preset type of network device exceeds the signal strength threshold;

A receiving module 33, configured to receive information on the MDT measurement of the preset type of network device from the UE.

Figure 8:
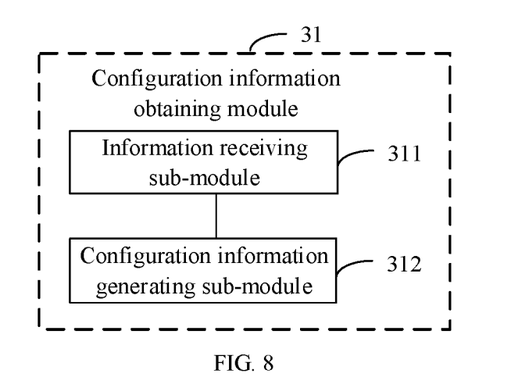
FIG. 8 is a block diagram of another apparatus for MDT measurement according to an example of the present disclosure.

FIG. 8 is a block diagram of an apparatus for MDT measurement according to an example of the present disclosure. Based on the apparatus example of FIG. 7, the configuration information obtaining module 31 may include the following sub-modules.

An information receiving sub-module 311, configured to receive initial MDT measurement configuration information from a core network or a source base station, the initial MDT measurement configuration information for each of the one or more preset types of network devices includes: the signal strength threshold for the preset type of network device.

A configuration information generating sub-module 312, configured to generate the MDT measurement configuration information for the one or more preset types of network devices based on the initial MDT measurement configuration information for the one or more preset types of network device and one or more preset MDT measurement parameters.

Figure 9:
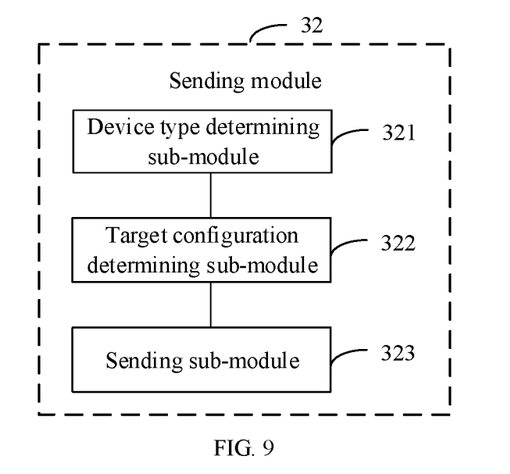
FIG. 9 is a block diagram of another apparatus for MDT measurement according to an example of the present disclosure.

FIG. 9 is a block diagram of another apparatus for MDT measurement according to an example of the present disclosure. Based on the apparatus example of FIG. 7, the sending module 32 may include the following sub-modules.

A device type determining sub-module 321, configured to determine a type of a target network device detected by the UE.

A target configuration determining sub-module 322, configured to determine target MDT measurement configuration information according to the type of the target network device and the MDT measurement configuration information;

A sending sub-module 323, configured to send the target MDT measurement configuration information to the UE.

Figure 10:
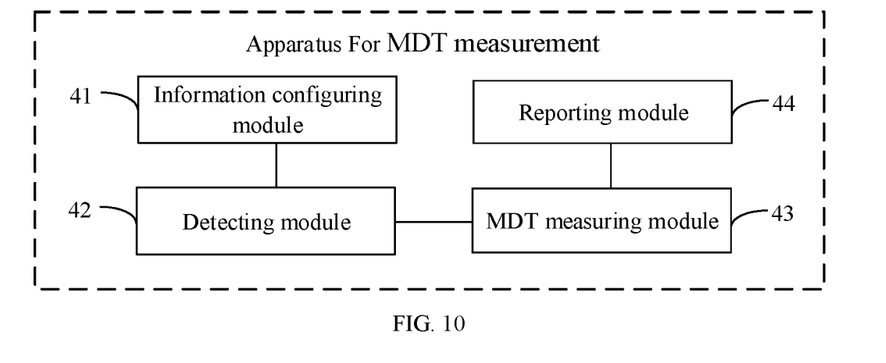
FIG. 10 is a block diagram of an apparatus for MDT measurement according to an example of the present disclosure.

Correspondingly, the present disclosure also provides an apparatus for MDT measurement, which is set in a UE. FIG. 10 is a block diagram of an apparatus for MDT measurement according to an example of the present disclosure. The apparatus may include the following sub-modules.

An information configuring module 41, configured to receive from a base station, MDT measurement configuration information, and performing an MDT measurement configuration based on the received MDT measurement configuration information, the MDT measurement configuration information including at least one signal strength thresholds for the one or more preset types of network device.

In the present disclosure, the one or more preset types of network devices includes at least one of a Bluetooth device or a wireless local area network (WLAN) device.

A detecting module 42, configured to detect a signal strength of a target network device.

An MDT measuring module 43, configured to perform MDT measurement on of the target network device when the signal strength exceeding the signal strength threshold for the target network device.

A reporting module 44, configured to send the information on the MDT measurement of the target network device to the base station.

Figure 11:
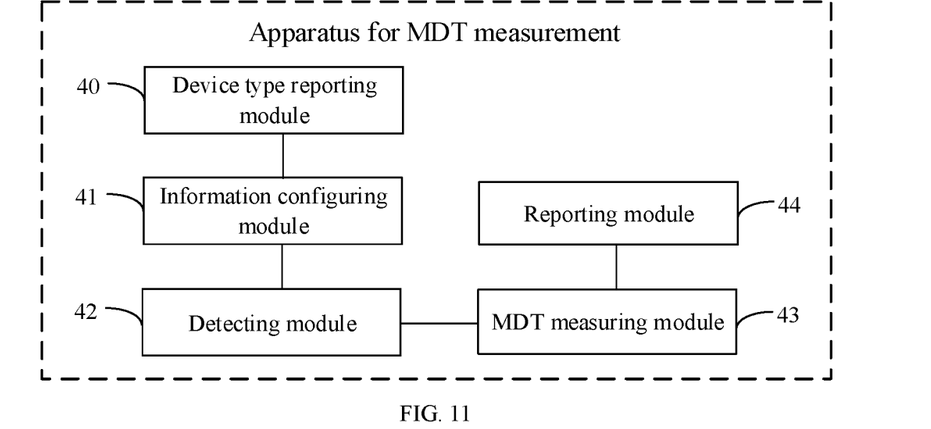
FIG. 11 is a block diagram of another apparatus for MDT measurement according to an example of the present disclosure.

FIG. 11 is a block diagram of another apparatus for MDT measurement according to an example of the present disclosure. Based on the example shown in FIG. 10, the apparatus may include the following sub-modules.

A device type reporting module 40 configured to report a type of the target network device currently detected to the base station.

Figure 12:
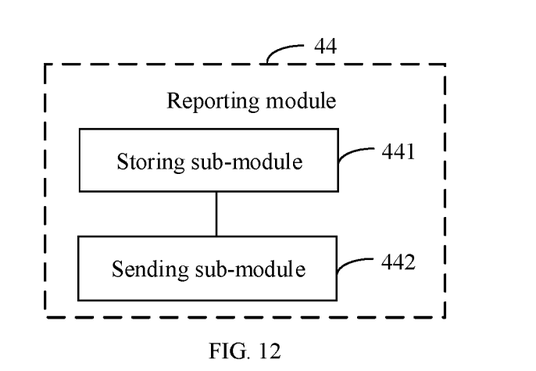
FIG. 12 is a block diagram of another apparatus for MDT measurement according to an example of the present disclosure.

FIG. 12 is a block diagram of another apparatus for MDT measurement according to an example of the present disclosure. Based on the example shown in FIG. 10, the reporting module 44 may include the following sub-modules.

a storing sub-module 441, configured to store the information on the MDT measurement of the target network device.

a sending sub-module 442, configured to send the stored information on the MDT measurement of the target network device to the base station when the UE switches to a connection state.

Figure 13:
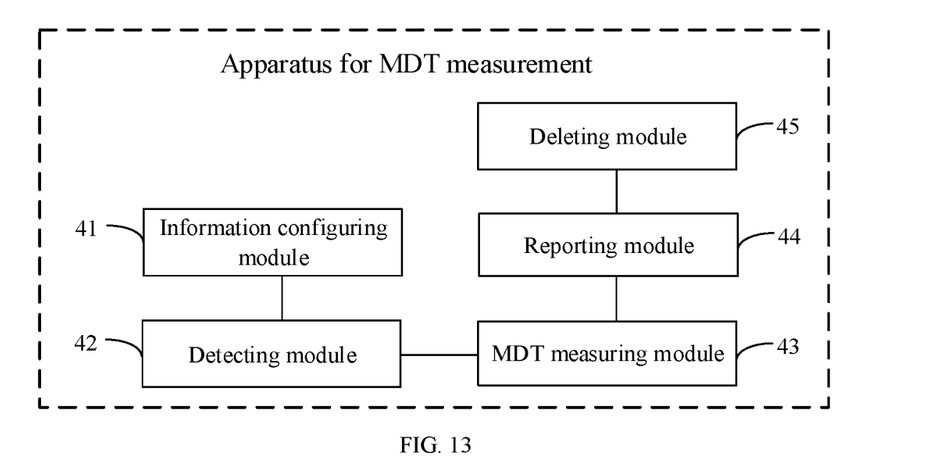
FIG. 13 is a block diagram of another apparatus for MDT measurement according to an example of the present disclosure.

FIG. 13 is a block diagram of another apparatus for MDT measurement according to an example of the present disclosure. Based on the example shown in FIG. 10, the apparatus 44 may further include: a deleting module 45, configured to delete the stored information on the MDT measurement of the target network device.

Since the device examples substantially correspond to the method examples, a reference may be made to part of the descriptions of the method examples for the related part. The device examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

Correspondingly, in one aspect, an apparatus for MDT measurement is provided, including:

a processor;

a memory for storing executable instructions by the processor;

wherein, the processor is configured to:

obtain minimization of drive tests (MDT) measurement configuration information for one or more preset types of network devices, the MDT measurement configuration information for each of the one or more preset types of network devices at least includes: a signal strength threshold for the preset type of network device;

send the MDT measurement configuration information to UE, such that the UE performs MDT measurement upon detecting that the signal strength of the preset type of network device exceeds the signal strength threshold;

receive information on the MDT measurement of the preset type of network device from the UE.

In another aspect, another apparatus for MDT measurement is provided, including:

a processor;

a memory for storing executable instructions by the processor;

wherein, the processor is configured to:

receive from a base station, MDT measurement configuration information, and performing an MDT measurement configuration based on the received MDT measurement configuration information, the MDT measurement configuration information for the target type of network device including at least a signal strength threshold for the preset type of network device;

detect a signal strength of a target network device;

perform MDT measurement on of the target network device when the signal strength exceeding the signal strength threshold for the target network device;

send the stored information on the MDT measurement of the target network device to the base station.

Figure 14:
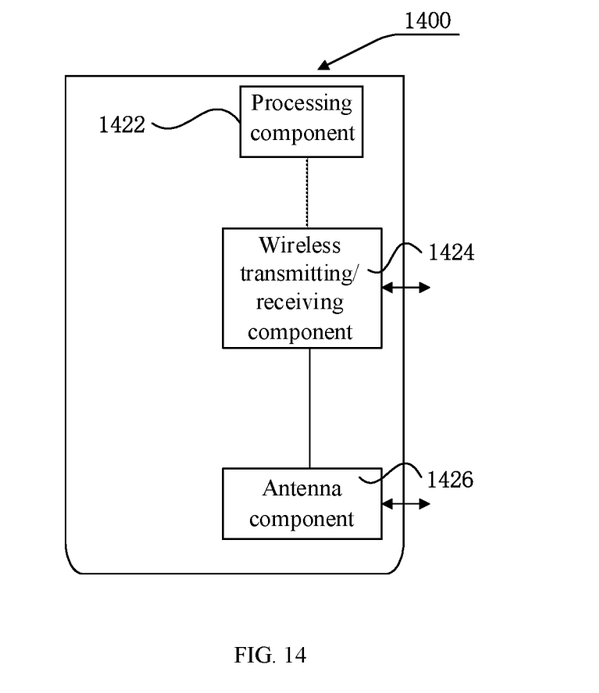
FIG. 14 is a schematic diagram of a structure of an apparatus for MDT measurement according to an example of the present disclosure.

As shown in FIG. 14, FIG. 14 is a schematic diagram of a structure of an apparatus 1400 for MDT measurement according to an example of the present disclosure. An apparatus 1400 may be provided as a base station. Referring to FIG. 14, the apparatus 1400 includes a processing component 1422, a wireless transmitting/receiving component 1424, an antenna component 1426, and a signal processing portion specific to a wireless interface. The processing component 1422 may further include one or more processors.

One the processor of the processing component 1422 may be configured to:

obtain minimization of drive tests (MDT) measurement configuration information for a preset type of network device, the MDT measurement configuration information at least includes: a signal strength threshold for the preset type of network device;

send the MDT measurement configuration information to a user equipment UE, so that the UE performs MDT measurement when detecting that the signal strength of the preset type of network device exceeds the signal strength threshold;

receive MDT measurement information of the preset type of network device sent by the UE.

In an exemplary example, there is also provided a non-transitory computer readable storage medium comprising instructions, such as a memory 2604 comprising instructions executable by processor 2620 of device 2600 to perform any one of the methods shown in FIG. 1-3. For example, the non-transitory computer readable storage medium may be a ROM, a random access memory (RAM), a CD-ROM, a magnetic tape, a floppy disk, and an optical data storage device.

Figure 15:
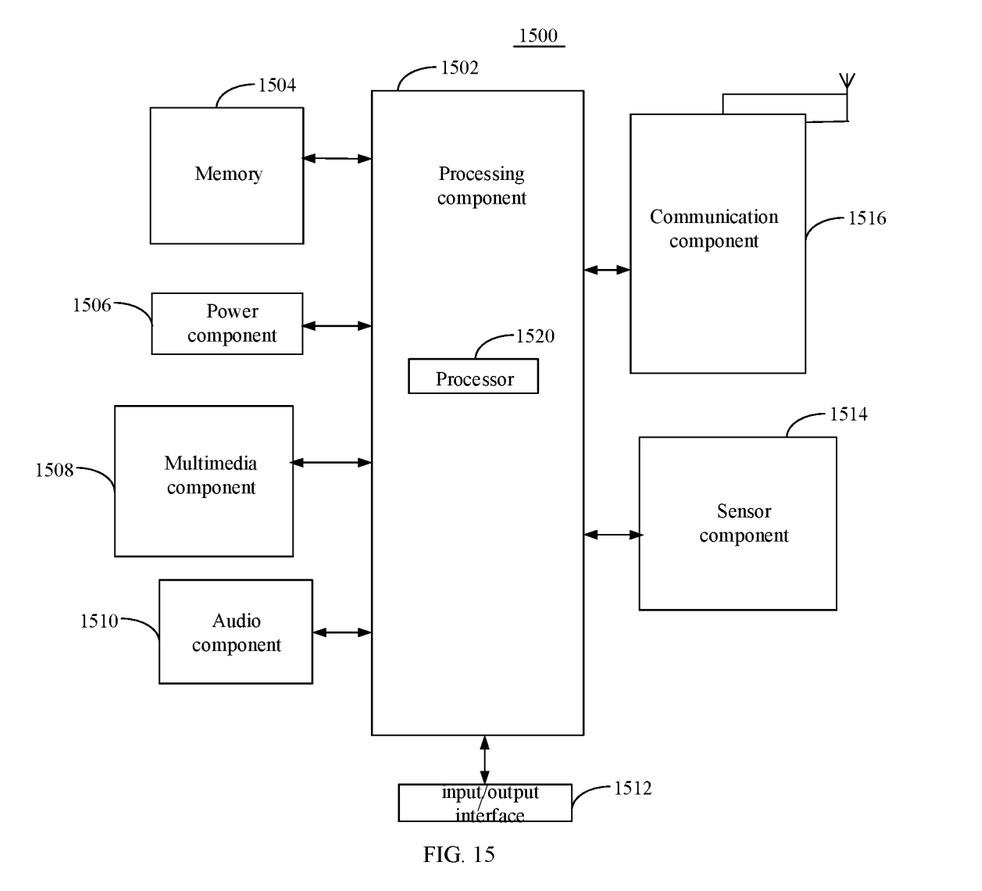
FIG. 15 is a schematic diagram of a structure of an apparatus for MDT measurement according to an example of the present disclosure.

FIG. 15 is a schematic diagram of a structure of an apparatus 1500 for MDT measurement according to an example of the present disclosure. For example, the device 1500 may be a terminal, and may specifically be a mobile phone, a computer, a digital broadcasting terminal, a message receiving and sending device, a game console, a tablet device, a medical device, a fitness device, a personal digital assistant, a wearable device such as a smart watch, a smart glass, a smart band, a smart running shoe and the like.

Referring to FIG. 15, apparatus 1500 can include one or more of the following components: processing component 1502, memory 1504, power component 1506, multimedia component 1508, audio component 1510, input/output (I/O) interface 1512, sensor component 1514, and a communication component 1516.

Processing component 1502 typically controls the overall operation of apparatus 1500, such as operations associated with display, telephone calls, data communications, camera operations, and recording operations. Processing component 1502 can include one or more processors 1520 to execute instructions to perform all or part of the steps described above. Moreover, processing component 1502 can include one or more modules to facilitate interaction between component 1502 and other components. For example, processing component 1502 can include a multimedia module to facilitate interaction between multimedia component 1508 and processing component 1502.

The memory 1504 is to store various types of data to support the operation of the apparatus 1500. Examples of such data include instructions for any application or method operating on apparatus 1500, contact data, phone book data, messages, pictures, videos, and the like. The memory 1504 can be implemented by any type of volatile or non-volatile storage device or a combination thereof, such as static random access memory (SRAM), electrically erasable programmable read only memory (EEPROM), erasable programmable Read Only Memory (EPROM), programmable Read Only Memory (PROM), Read Only Memory (ROM), Magnetic Memory, Flash Memory, Disk or Optical Disk.

Power component 1506 provides power to various components of apparatus 1500. Power component 1506 can include a power management system, one or more power sources, and other components associated with generating, managing, and distributing power for apparatus 1500.

The multimedia component 1508 includes a screen providing an output interface between the apparatus 1500 and a user. In some examples, the screen can include a liquid crystal display (LCD) and a touch panel (TP). If the screen includes a touch panel, the screen can be implemented as a touch screen to receive input signals from the user. The touch panel includes one or more touch sensors to sense touches, swipes, and gestures on the touch panel. The touch sensors may not only sense a boundary of a touch or swipe, but also sense a duration and a pressure associated with the touch or swipe. In some examples, the multimedia component 1508 includes a front camera and/or a rear camera. The front camera and/or rear camera may receive external multimedia data when the apparatus 1500 is in an operating mode, such as a photographing mode or a video mode. Each front and rear camera can be a fixed optical lens system or have focal length and optical zoom capabilities.

The audio component 1510 is configured to output and/or input an audio signal. For example, audio component 1510 includes a microphone (MIC) that is configured to receive an external audio signal when apparatus 1500 is in an operational mode, such as a call mode, a recording mode, and a voice recognition mode. The received audio signal may be further stored in memory 1504 or transmitted via communication component 1516. In some examples, audio component 1510 also includes a speaker for outputting an audio signal.

The I/O interface 1512 provides an interface between the processing component 1502 and the peripheral interface module, which may be a keyboard, a click wheel, a button, or the like. These buttons may include, but are not limited to, a home button, a volume button, a start button, and a lock button.

Sensor component 1514 includes one or more sensors for providing apparatus 1500 with a status assessment of various aspects. For example, the sensor component 1514 may detect the on/off status of the apparatus 1500, and relative positioning of component, for example, the component is a display and a keypad of the apparatus 1500. The sensor component 1514 may also detect a change in position of the apparatus 1500 or a component of the apparatus 1500, a presence or absence of the contact between a user and the apparatus 1500, an orientation or an acceleration/deceleration of the apparatus 1500, and a change in temperature of the apparatus 1500. Sensor component 1514 can include a proximity sensor configured to detect the presence of nearby objects without any physical contact. Sensor component 1514 may also include a light sensor, such as a CMOS or CCD image sensor, for use in imaging applications. In some examples, the sensor component 1514 can also include an acceleration sensor, a gyro sensor, a magnetic sensor, a pressure sensor, or a temperature sensor.

Communication component 1516 is configured to facilitate wired or wireless communication between apparatus 1500 and other devices. The apparatus 1500 can access a wireless network based on a communication standard, such as Wi-Fi, 2G or 3G, or a combination thereof. In an exemplary example, communication component 1516 receives broadcast signals or broadcast associated information from an external broadcast management system via a broadcast channel. In an example, the communication component 1516 further includes a Near Field Communication (NFC) module to facilitate short-range communications. For example, the NFC module can be implemented based on radio frequency identification (RFID) technology, infrared data association (IrDA) technology, ultra-wideband (UWB) technology, Bluetooth (BT) technology, and other technologies.

In an example, the apparatus 1500 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components for performing any one of the methods shown in FIG. 4-6.

In an example, there is also provided a non-transitory computer-readable storage medium including instructions, such as a memory 1504 including instructions. The above instructions may be executed by the processor 1520 of the apparatus 1500 to complete the above method of MDT measurement, For example, the non-transitory computer readable storage medium may be a ROM, a random access memory (RAM), a CD-ROM, a magnetic tape, a floppy disk, and an optical data storage device.

The technical solutions provided by the examples of the present disclosure may include the following beneficial effects: Using the disclosed method of MDT measurement in the present disclosure, an UE can perform MDT measurement configuration information for a preset type of network device sent by a base station. When the UE detects that a signal strength of the target network device exceeds a preset signal strength threshold, the UE may perform MDT measurement on a target network device and report the measurement information to the base station. The disclosed methods and devices effectively avoid a waste of power consumption and system resources caused by frequent MDT measurement and reporting by the UE, which realizes effective measurement for the preset type of network device while reducing power consumption and signaling overhead, and improves the user experience of UE for indoor scene applications of MDT.

Other implementations of the present disclosure will be readily apparent to those skilled in the art after implementing the disclosure by referring to the specification. The present application is intended to cover any variations, uses, or adaptations of the present disclosure, which are in accordance with the general principles of the present disclosure and include common general knowledge or conventional technical means in the art that are not disclosed in the present disclosure. The specification and examples therein are only illustrative, and the scope and spirit of the disclosure are to be indicated by appended claims.

It is to be understood that this disclosure is not limited to the above described structures shown in the drawings, and various changes and modifications can be made to the disclosure without departing from the scope thereof. The scope of the disclosure is to be limited only by the appended claims.

The invention claimed is:

1. A method of minimization of drive tests (MDT) measurement, which is applicable to a base station, the method comprising:
    obtaining MDT measurement configuration information for a one or more preset types of network devices,
    the MDT measurement configuration information for each of the one or more preset types of network devices comprising a signal strength threshold for the preset type of network device;
    sending the MDT measurement configuration information to user equipment (UE), such that the UE performs MDT measurement upon detecting that the signal strength of the preset type of network device exceeds the signal strength threshold; and
    receiving information on the MDT measurement of the preset type of network device from the UE.

2. The method of claim 1, wherein obtaining the MDT measurement configuration information for the one or more preset types of network devices comprises:
    receiving initial MDT measurement configuration information from a core network or a source base station, the initial MDT measurement configuration information for each of the one or more preset types of network devices including the signal strength threshold for the preset type of network device; and
    generating the MDT measurement configuration information based on the initial MDT measurement configuration information for the one or more preset types of network device and one or more preset MDT measurement parameters.

3. The method of claim 1, wherein sending the MDT measurement configuration information to the UE comprises:
    determining a type of a target network device detected by the UE;

determining target MDT measurement configuration information according to the type of the target network device and the MDT measurement configuration information; and sending the target MDT measurement configuration information to the UE.

4. The method of claim 1, wherein the one or more preset types of network devices comprises at least one of a Bluetooth device or a wireless local area network (WLAN) device.

5. A non-transitory computer-readable storage medium storing a computer instructions that, when executed by a processor, causes the processor to implement the method according to claim 1.

6. An apparatus for MDT measurement, comprising: a processor; and a memory for storing instructions that are executable by the processor to perform operations in the method of claim 1.

7. A method of MDT measurement, which is applicable to UE, the method comprising:

receiving, from a base station, MDT measurement configuration information, and performing an MDT measurement configuration based on the received MDT measurement configuration information, the MDT measurement configuration information comprising at least one signal strength threshold for one or more preset types of network devices;

detecting a signal strength of a target network device;

performing MOT measurement on of the target network device when the signal strength exceeding the signal strength threshold for target network device; and sending information on the MDT measurement of the target network device to the base station.

8. The method of claim 7, the method further comprising: prior to receiving, from the base station, the MDT measurement configuration information, reporting a type of the target network device currently detected to the base station.

9. The method of claim 7, wherein sending the information on the MDT measurement of the target network device to the base station comprises: storing the information on the MDT measurement of the target network device; and sending the stored information on the MDT measurement of the target network device to the base station in response to the UE switching to a connection state.

10. The method of claim 9, the method further comprising: after sending the stored information on the MDT measurement of the target network device to the base station, deleting the stored information on the MDT measurement of the target network device.

11. The method of claim 7, wherein the one or more preset types of network devices comprises at least one of a Bluetooth device or a WLAN device.

12. A non-transitory computer-readable storage medium storing a computer instructions that, when executed by a processor, causes the processor to implement the method according to 7.

13. An apparatus for minimization of drive tests (MDT) measurement, comprising:

a processor; and a memory for storing instructions that are executable by the processor to perform operations comprising:

receiving, from a base station, MDT measurement configuration information, and performing an MDT measurement configuration based on the received MDT measurement configuration information, the MDT measurement configuration information including at least one signal strength threshold for one or more preset types of network devices;

detecting a signal strength of a target network device;

performing MDT measurement on of the target network device when the signal strength exceeding the signal strength threshold for the target network device; and sending information on the MDT measurement of the target network device to the base station.

14. The apparatus of claim 13, wherein the operations further comprise; prior to receiving, from the base station, the MDT measurement configuration information, reporting a type of the target network device currently detected to the base station.

15. The apparatus of claim 13, wherein sending the information on the MDT measurement of the target network device to the base station comprise: storing the information on the MDT measurement of the target network device; and sending the stored information on the MDT measurement of the target network device to the base station in response to the UE switching to a connection state.

16. The apparatus of claim 15, wherein the operations further comprise: after sending the stored information on the MDT measurement of the target network device to the base station, deleting the stored information on the MDT measurement of the target network device.

17. The apparatus of claim 13, wherein the one or more preset types of network devices comprise at least one of a Bluetooth device or a WLAN device.

* * * * *